US012567977B2

(12) United States Patent
Hild et al.

(10) Patent No.: US 12,567,977 B2
(45) Date of Patent: Mar. 3, 2026

(54) METHOD, VEHICLE COMPONENT, AND COMPUTER PROGRAM FOR GRANTING AUTHORIZATION TO RUN A COMPUTER PROGRAM BY MEANS OF A VEHICLE COMPONENT OF A VEHICLE

(71) Applicant: Bayerische Motoren Werke Aktiengesellschaft, Munich (DE)

(72) Inventors: Sebastian Hild, Germering (DE); Elmar Schoch, Dachau (DE); Richard Wimmer, Anzing (DE); Maximilian Raith, Munich (DE); Michael Gruffke, Erding (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 50 days.

(21) Appl. No.: 18/699,538

(22) PCT Filed: May 30, 2022

(86) PCT No.: PCT/EP2022/064614
§ 371 (c)(1),
(2) Date: Apr. 8, 2024

(87) PCT Pub. No.: WO2023/083500
PCT Pub. Date: May 19, 2023

(65) Prior Publication Data
US 2024/0406006 A1       Dec. 5, 2024

(30) Foreign Application Priority Data
Nov. 15, 2021       (DE) .................... 10 2021 129 670.6

(51) Int. Cl.
*H04L 9/32*       (2006.01)
(52) U.S. Cl.
CPC ................................. *H04L 9/3247* (2013.01)

(58) Field of Classification Search
None
See application file for complete search history.

(56) References Cited

U.S. PATENT DOCUMENTS

2002/0023223 A1* 2/2002 Schmidt ................ H04L 9/3263
                                                                713/175
2004/0003227 A1* 1/2004 Reinold ................ H04L 9/3263
                                                                713/155
(Continued)

FOREIGN PATENT DOCUMENTS

DE       102016115545 A1       3/2017
DE       102018101856 A1       8/2018
(Continued)

OTHER PUBLICATIONS

International Search Report corresponding to International Patent Application No. PCT/EP2022/064614, dated Sep. 27, 2022 (5 pages).
(Continued)

*Primary Examiner* — Jeffrey R Swearingen
(74) *Attorney, Agent, or Firm* — Maginot, Moore & Beck LLP

(57) ABSTRACT

A method grants authorization to run a computer program using a vehicle component of a vehicle. The method includes storing identification information on the vehicle component as part of a production process, said identification information being specific to the vehicle component. An additional authentication key is stored in the vehicle component during a development process. The additional authentication key is linked to the identification information by means of a cryptographic signature. The method also includes obtaining the computer program for the vehicle component, wherein said computer program is cryptographically signed. The method further includes running the computer program if the cryptographic signature of the computer (Continued)

STORING IDENTIFICATION INFORMATION ⌐ 110

STORING AN ADDITIONAL AUTHENTICATION KEY ⌐ 120

OBTAINING A COMPUTER PROGRAM ⌐ 130

AUTHENTICATING A CRYPTOGRAPHIC SIGNATURE OF THE COMPUTER PROGRAM ⌐ 140

RUNNING THE COMPUTER PROGRAM ⌐ 150

REMOVING THE ADDITIONAL AUTHENTICATION KEY ⌐ 160 program is valid according to an authentication process using the additional authentication key and if the cryptographic signature is based on the identification information.

20 Claims, 2 Drawing Sheets

(56) References Cited

U.S. PATENT DOCUMENTS

2004/0003232 A1\* 1/2004 Levenson .......... B60R 16/0234
713/155
2004/0003233 A1\* 1/2004 Reinold ............. H04L 63/0823
713/155
2004/0003237 A1\* 1/2004 Puhl ................... B60R 16/0234
713/168
2004/0003245 A1\* 1/2004 Dabbish ............... B60R 25/307
713/168
2004/0003252 A1\* 1/2004 Dabbish ............... B60R 25/307
713/175
2014/0075517 A1 3/2014 Alrabady et al.
2014/0380442 A1\* 12/2014 Addepalli ............. B60W 50/10
726/6
2017/0103209 A1 4/2017 Wooten et al.
2023/0327883 A1\* 10/2023 Ansari .................. H04L 9/3247
713/2

FOREIGN PATENT DOCUMENTS

EP          3696699  A1     8/2020
WO      2008058748  A1     5/2008

OTHER PUBLICATIONS

Written Opinion corresponding to International Patent Application No. PCT/EP2022/064614, dated Sep. 27, 2022 (5 pages).
German Search Report corresponding to German Patent Application No. 10 2021 129 670.6, dated Jun. 10, 2022. (9 pages).

\* cited by examiner

STORING IDENTIFICATION INFORMATION — 110

STORING AN ADDITIONAL AUTHENTICATION KEY — 120

OBTAINING A COMPUTER PROGRAM — 130

AUTHENTICATING A CRYPTOGRAPHIC SIGNATURE OF THE COMPUTER PROGRAM — 140

RUNNING THE COMPUTER PROGRAM — 150

REMOVING THE ADDITIONAL AUTHENTICATION KEY — 160

METHOD, VEHICLE COMPONENT, AND COMPUTER PROGRAM FOR GRANTING AUTHORIZATION TO RUN A COMPUTER PROGRAM BY MEANS OF A VEHICLE COMPONENT OF A VEHICLE

The present application is the U.S. national phase of PCT Application PCT/EP2022/064614 filed on May 30, 2022, which claims priority of German patent application No. 102021129670.6 filed on Nov. 15, 2021, the entire contents of which are incorporated herein by reference.

TECHNICAL FIELD

The present disclosure relates generally to methods and apparatus for granting authorization to run a computer program by means of a vehicle component of a vehicle, and to a vehicle comprising a corresponding vehicle component.

BACKGROUND

Modern vehicles have a large number of different vehicle components, some of which can run computer programs. For example, vehicles have an infotainment and navigation system, the functionality of which is provided by software. However, other vehicle components, such as an e-call system call (electronic system), are also implemented at least by a processor on which a computer program is run. In terms of driving safety, however, the vehicle manufacturer has an interest in ensuring that computer programs running on the vehicle are tested and approved by the manufacturer. The vehicle manufacturer may therefore endeavor to ensure the integrity and authenticity of the software on the vehicle's components. This is done by cryptographic measures. Examples of this are given in German patent publication DE 101 40 721 A1 and German patent publication DE 103 54 107 A1.

In the development process for a vehicle, many of the vehicle components are provided by suppliers. These suppliers generally also provide the associated software, according to the vehicle manufacturer's specifications. In addition, third-party software is also gradually being provided, such as software for accessing online music libraries, software for linking vehicles and mobile devices, or software for locating and querying charging stations. These suppliers or third-party manufacturers require options for testing the software they have developed on the respective vehicle components or directly in the vehicle, if possible on the series version of the respective vehicle component. To prevent vehicle components from being traded on the gray market without cryptographic protection, this software is signed by the vehicle manufacturer, just like the software used in production vehicles, and can then be tested in the vehicle or on the vehicle component. This increases the effort and requirements for the vehicle manufacturer's cryptography-based security system and represents a bottleneck and a source of in the development process.

There is therefore a need to provide an improved concept for developing and testing computer programs for vehicle components.

SUMMARY

The above discussed need, as well as others are addressed by at least some of the embodiments disclosed herein.

Various embodiments are based on the realization that the development and testing process for computer programs for a vehicle component can be improved by introducing identification information and an additional authentication key into the vehicle component in addition to the cryptographic measures provided for series operation of the vehicle component. The additional authentication key is used to secure the running of the computer program to be tested. This additional authentication key is also cryptographically linked to the identification information, so that this authentication key can only be used in precisely this vehicle component. The computer program to be run is now cryptographically signed by the developer. This signature is now checked and declared valid if it can be authenticated using the additional authentication key on the one hand and is based on the identification information on the other. This allows the developers of the supplier or third-party manufacturer to test software on series components as independently as possible without compromising the security of the series component as installed in other vehicles. Once the development process is complete, the additional authentication key is removed again.

Exemplary embodiments provide a method for granting authorization to run a computer program by a vehicle component of a vehicle. The method comprises storing identification information on the vehicle component as part of a production process. The identification information is specific to the vehicle component. The method additionally comprises storing an additional authentication key in the vehicle component during a development process, said authentication key being linked to the identification information by means of a cryptographic signature. The method further comprises obtaining the computer program for the vehicle component. The computer program is cryptographically signed. The method further comprises running the computer program if the cryptographic signature of the computer program is valid according to the authentication using the introduced authentication key and if the cryptographic signature is based on the identification information. Optionally, the method further comprises removing the additional authentication key after the development process is completed. The proposed method allows the developers of the supplier or third-party manufacturer to test software on series components as independently as possible without compromising the security of the series component as installed in other vehicles.

As explained above, the authentication key is used to avoid overloading the vehicle manufacturer's cryptographic infrastructure during the development process. For example, the additional authentication key can be provided to enable the running of computer programs in addition to a public key infrastructure of the vehicle manufacturer.

The identification information is linked to the specific vehicle component. This property can now be used to restrict the usability of the signed computer program to one vehicle component or a few vehicle components. For example, the cryptographic signature of the computer program can be specific to a single vehicle component or a single vehicle. Alternatively, the cryptographic signature of the computer program can be specific to a defined set of vehicle components or vehicles.

This can be done by including the respective identification information of one or more vehicle components in the signature of the computer program. For example, the computer program can be signed together with one or more pieces of identification information of one or more vehicle components or vehicles.

An objective of the method presented is to facilitate the development work of suppliers and third-party software manufacturers. At the same time, it should be noted that this functionality cannot be extended to any number of vehicle components. Therefore, the additional authentication key can in turn be signed by the vehicle manufacturer and thus linked to the identification information. In other words, the cryptographic signature with which the additional authentication key is linked to the identification information can be generated by the manufacturer of the vehicle.

The cryptographic signature of the computer program can in turn be generated based on the identification information of the vehicle component or the vehicle by a manufacturer of the vehicle component or by a third party, i.e., explicitly not by the vehicle manufacturer, so that the cryptographic infrastructure of the vehicle manufacturer does not have to be used when a new test version is transmitted to the vehicle component.

The additional aspects are integrated into the security concept of the vehicle component. For example, the cryptographic signature of the computer program, the additional authentication key and the identification information can be authenticated by a bootloader of the vehicle component. This prevents the additional authentication key from being used also on other vehicle components, for example.

Exemplary embodiments further provide a program comprising a program code for performing the method described above when the program code is run on a computer, a processor, a control module or a programmable hardware component.

Exemplary embodiments further provide a vehicle component comprising one or more processors and one or more memory devices, wherein the vehicle component is designed to perform the method described above.

Exemplary embodiments further provide a vehicle comprising one or more of the vehicle components.

DETAILED DESCRIPTION

Various exemplary embodiments will now be described in greater detail with reference to the accompanying drawings, in which some exemplary embodiments are shown. In the figures, the thickness dimensions of lines, layers and/or regions may be exaggerated for the sake of clarity.

Various exemplary embodiments of the present disclosure relate to cryptographic protection in order to be able to unlock additional software in addition to the series software on selected components.

As already explained above, software is developed as part of the development and protection of vehicle components or the development of software by third-party manufacturers, which is to be tested on series hardware. This includes, for example, a computer program for accessing online music libraries, a computer program for linking vehicles and mobile devices, or a computer program for locating and querying charging stations. At the same time, however, this software should not be able to be used in an uncontrolled manner on customer vehicles. The software permitted on customer vehicles should be kept to a minimum. However, identical hardware should be used for development so that there is no deviation from series production. For these components in development, the restrictions should be reduced as far as possible so that undisturbed development and validation is possible. In general, such protection relies on a public key infrastructure either directly or via a chain of trust (security chain). Certificates and signatures are used for software integrity and authenticity on vehicle components. Correctness is checked, for example, when the software is installed or started.

On the one hand, special hardware could be used for development, which uses a different security concept to the standard hardware. However, the production of special hardware for development with the security mechanism for verifying the software switched off is costly and carries the risk that this hardware will also be produced for unwanted customers. For the development of applications on mobile devices, for example, developer programs are used that can be unlocked to allow users to install their own software on dedicated devices.

Figure 1:
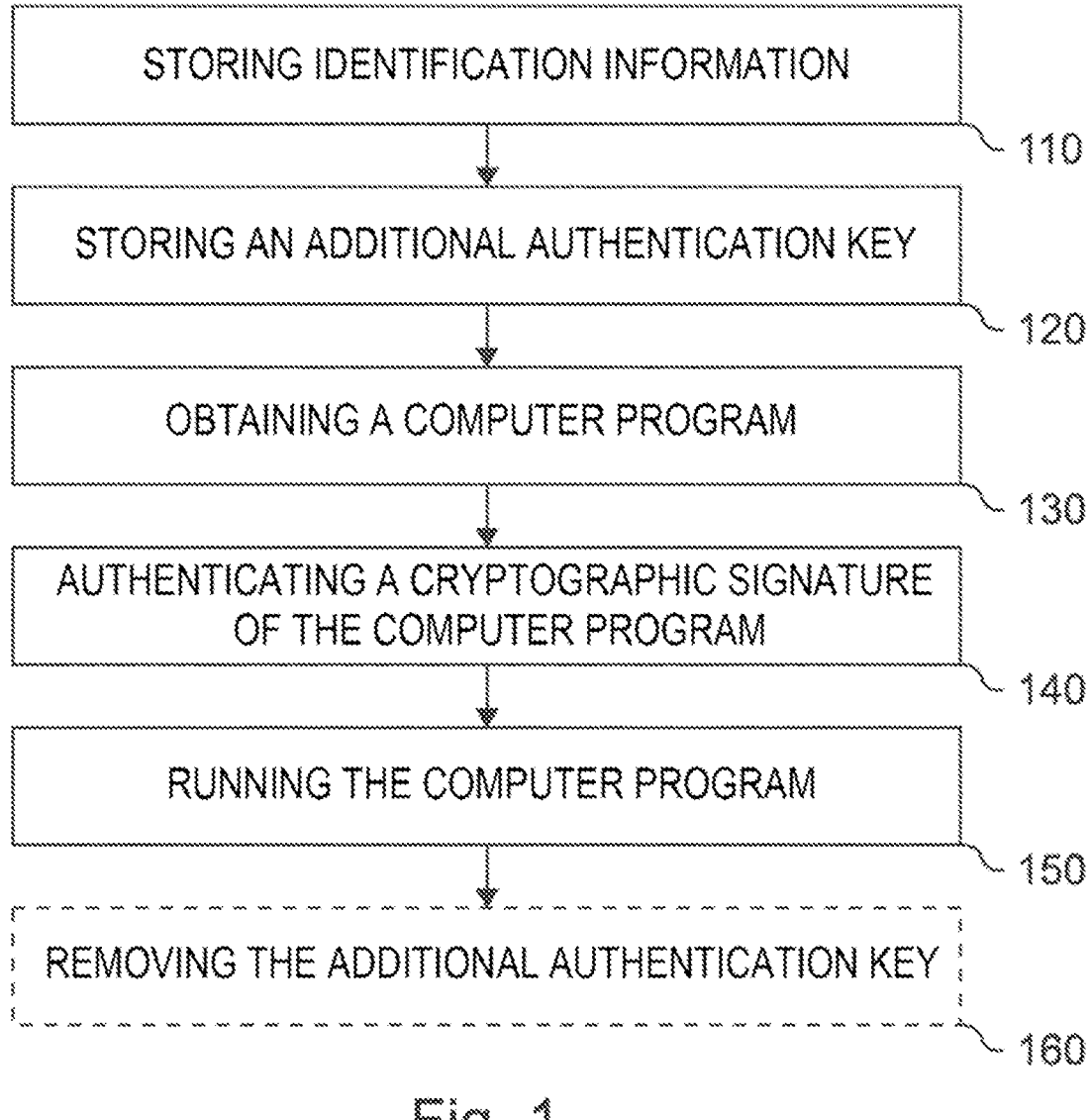
FIG. 1 shows a flowchart of an example of a method for granting authorization to run a computer program by means of a vehicle component of a vehicle.

FIG. 1 shows a flowchart of an example of a (computer-implemented) method for granting authorization to run a computer program by a vehicle component of a vehicle. The method further comprises storing 110 identification information on the vehicle component as part of a production process. The identification information is specific to the vehicle component. The method additionally comprises storing 120 an additional authentication key in the vehicle component during a development process. The additional authentication key is linked to the identification information by means of a cryptographic signature. The method further comprises obtaining 130 the computer program for the vehicle component. The computer program is cryptographically signed. The method further comprises running 150 the computer program if the cryptographic signature of the computer program is valid according to an authentication 140 using the introduced authentication key and if the cryptographic signature is based on the identification information. The method is performed, for example, by the vehicle component, such as by one or more processors of the vehicle component, in conjunction with one or more memory devices and one or more interfaces of the vehicle component.

The present disclosure relates to a method, a vehicle component and a computer program for granting authorization to run a computer program through a vehicle component of a vehicle.

In general, securing the running of computer programs (i.e., software) on vehicle components is based on a cryptographic infrastructure of the vehicle manufacturer, such as a public key infrastructure (PKI) of the vehicle manufacturer. Software that is to be run on the vehicle components is signed by the vehicle manufacturer. This signature is then authenticated by the vehicle component, for example by a so-called bootloader (a system for initializing the software of the vehicle component at start-up) of the vehicle component, and the execution of the software is enabled if the authentication is possible. If a public key infrastructure is used, a combination of a so-called private key and a so-called public key of the vehicle manufacturer is used. These two keys form a so-called key pair, with the public key being derived from the private key. The private key is a well-kept secret of the vehicle manufacturer, while the public key can be passed on. The private key can now be used by the vehicle manufacturer to cryptographically sign the computer program. The public key, in turn, is stored on the vehicle component and can be used to verify the signature of the computer program generated by the private key. A so-called hash value of the computer program is usually formed and the signature is created based on the hash value. If the hash value of the computer program corresponds to the hash value stored in the signature and the signature "matches" the vehicle manufacturer's public key, the authentication of the computer program is successful. This procedure is used in the series versions of the vehicle components in order to strictly secure the execution of the software.

If the manufacturer of the vehicle component or a third-party manufacturer now develops a computer program for the vehicle component, the latter would need to have the computer program signed by the vehicle manufacturer for each test version, which generates a great deal of work for the vehicle manufacturer and can cause delays. This is where the present invention comes in. In addition to the test infrastructure already in use, a further authentication key is now introduced into the vehicle component, which is based on identification information of the vehicle component and is therefore specific to the vehicle component. In order to allow as free a development as possible for the development and validation of series components, the use of the software from development is enabled for selected components. This can be done via the existing public key infrastructure.

The vehicle component is unlocked with the help of two components: The identification information and the additional authentication key. The method therefore comprises storing 110 identification information on the as part of a production process and vehicle component storing 120 the additional authentication key in the vehicle component during a development process. It is clear that this can take place at different times. For example, the identification information is already introduced during the production process, i.e., during the original manufacture. The identification information is unique, i.e., unique in both directions, so that a vehicle component (or a vehicle) is assigned exactly one piece of identification information and the identification information is assigned to exactly one vehicle component (or vehicle). In other words, identification information is assigned to exactly one vehicle component (or vehicle). The identification information may, for example, be a binary code or an alphanumeric code or may be expressed as such. In addition, the identification information may be unchangeable. For example, the identification information may be stored in a read-only memory of the vehicle component, which is unchangeable after the end of the production process.

The additional authentication key is now added to the vehicle component based on the identification information. For example, the additional authentication key is generated based on the identification information. This links the unlocking of the vehicle component to the identification information via the signature/certificate. For example, a developer can read out the identification information of the vehicle component and transmit it to the vehicle manufacturer, who in turn can generate the additional authentication key based on the identification information together with the cryptographic signature. Alternatively, the additional authentication key can be generated by the developer (or the supplier/third-party manufacturer) and then coupled with the identification information via the cryptographic signature. In both cases, the cryptographic signature with which the additional authentication key is linked to the identification information is generated by the manufacturer of the vehicle. The cryptographic signature can also be generated using the vehicle manufacturer's private key. The cryptographic signature can thus also be verified using the vehicle manufacturer's public key.

The additional authentication key is intended to enable the running of computer programs in addition to a vehicle manufacturer's public key infrastructure. The additional authentication key is therefore introduced in addition to the vehicle manufacturer's public key, for example. Or, more generally, the additional authentication key is introduced in addition to another authentication key, such as the vehicle manufacturer's public key, which is used to restrict the running of computer programs in series operation of the vehicle component.

Now the computer program is obtained by the vehicle component, for example by uploading the computer program via a diagnostic interface of the vehicle component, or by retrieving the computer program from a platform for retrieving computer programs. The computer program is cryptographically signed. This signature is not generated by the vehicle manufacturer, for example, but is instead generated by the developer themself or by a cryptographic infrastructure of the supplier/third-party manufacturer. This can happen, for example, if the additional authentication key comes from the developer, supplier or third-party manufacturer, and only the signature with which the authentication key is bound to the identification information comes from the vehicle manufacturer themself. This thus allows the developer to generate the signature for the software independently by including the public key, i.e., the additional authentication key, for this signature in the unlocking. The developer, supplier or third-party manufacturer can now generate the signature using the corresponding private key. Thus, the cryptographic signature of the computer program can be generated based on the identification information of the vehicle component or the vehicle by a manufacturer of the vehicle component or by a third party. Alternatively, a signature may not be required at all or the signature of the developer software must still be signed via the infrastructure for the series software.

In order to prevent the computer program signed in this way from being used on any vehicle components with an additional authentication key (for example, on all vehicle components equipped with an additional authentication key by the supplier or third-party manufacturer), running can now be restricted to individual pieces of identification information by means of the identification information. For example, the cryptographic signature of the computer program can be specific to a single vehicle component or a single vehicle, or the cryptographic signature of the computer program can be specific to a defined set of vehicle components or vehicles. This can be done by basing the signature, in addition to a hash value of the computer program, on one or more pieces of identification information, i.e., the signature is generated for a package of computer program and one or more pieces of identification information. This means that several pieces of identification information can be released at once. For example, the computer program can be signed together with one or more pieces of identification information for one or more vehicle components or vehicles. This can be done by cryptographically signing a manifest with the hash value of the computer program and the one or more pieces of identification information. This then corresponds to the cryptographic signing of the computer program.

This can now be checked as part of the authentication of the cryptographic signature. The method comprises authenticating 140 the cryptographic signature with the introduced authentication key, wherein the authentication comprises checking whether the cryptographic signature is based on the identification information. Thus, three aspects are authenticated-a) whether the introduced additional authentication key is linked to the identification information via a cryptographic signature, b) whether the cryptographic signature of the computer program is recognized as valid by the additional authentication key, and c) whether the cryptographic signature of the computer program is based on the identification information. As a result of a) and b), a security chain (chain of trust) is established from the vehicle manufacturer to the signed computer program. As a result of a) and c), the computer program is prevented from being run on any vehicle components on any vehicle components with an additional authentication key. To authenticate c), the hash value of the computer program (which is calculated locally) can be compared with the hash value stored in the manifest and the identification information introduced can be compared with the one or more pieces of identification information contained in the manifest. For example, the cryptographic signature of the computer program (authentication aspects b) and c)), the additional authentication key (authentication aspect a)) and the identification information (authentication aspect a)) can be authenticated by a bootloader of the vehicle component.

If the authentication is successful, the computer program is run 150. This can take place in an execution environment provided by the vehicle component, for example alongside other computer programs. Alternatively, the computer program can be loaded as an image and run (on its own).

The proposed method enables a controlled release of the software from development for the vehicles/components with the selected identification information. Other processes can be used to ensure that these vehicles/IDs are not released for sale. Once the development process is complete, the additional authentication key is also removed. The method can therefore also include removing the additional authentication key after the development process has been completed. This may be the case, for example, if the development process can actually be considered complete, such as in the case of safety-critical software that is accepted at a certain point in time. However, in many cases, for example in cases where third-party manufacturers develop software a for vehicle's infotainment system, development is ongoing. Here, the additional authentication key can remain on the vehicle component during the progressive development process.

The following examples are used to briefly explain how signature authentication in the "normal case", i.e. without an additional authentication key, differs from the concept presented here. Normally, the production software is secured by a cryptographic signature. This signature originates, for example, from a PKI of the manufacturer. The bootloader checks the signature and only starts the software if the signature is correct.

In the case presented, i.e., in the event that the vehicle component is set for development, (1a) the development software (i.e., the computer program) is signed via the developer's signature. (1b) A PKI of the manufacturer has signed a package consisting of unique identification information of the component and key for signature of the developer (i.e., the additional authentication key). (2a) The bootloader recognizes that the additional packet of identification information and developer key is present and authenticates this signature. (2b) If the signature authentication was successful, the software is authenticated with the developer signature key. (3) If the authentication is successful, the control unit starts the development software.

Figure 2A:
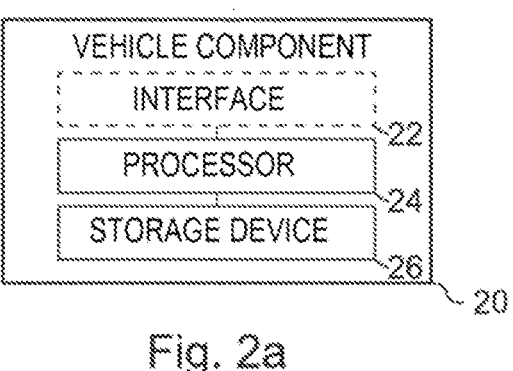
FIG. 2a shows a block diagram of an example of a vehicle component.

FIG. 2a shows a block diagram of an example of a vehicle component 20. This vehicle component 20 can now be used, for example, to carry out the method presented in FIG. 1. In particular, the vehicle component comprises one or more processors 24 and one or more memory devices 26. Optionally, the vehicle component further comprises one or more interfaces 22. The one or more processors 24 are linked to the one or more memory devices 26 and the one or more interfaces 22. The functionality of the vehicle component, at least with respect to the above method, is provided by the one or more processors 24, with the aid of the one or more storage devices 26 (for storing information such as the identification information, the additional authentication key, the vehicle manufacturer's public key and the computer program) and the one or more interfaces (for exchanging information). For example, the vehicle component may be a computer-based vehicle component, such as a computer-based control unit or a central computer unit (such as an infotainment system) of the vehicle.

The one or more interfaces 22 may, for example, correspond to one or more inputs and/or one or more outputs for receiving and/or transmitting information, for example in digital bit values based on a code, within a module, between modules, or between modules of different entities.

The one or more processors 24 may correspond to any controller or processor or programmable hardware component. For example, the functionality of the one or more processors 24 may also be implemented as software programmed for a corresponding hardware component. In this respect, the one or more processors 24 can be implemented as programmable hardware with correspondingly adapted software. Any processors, such as digital signal processors (DSPs), can be used. Embodiments are not limited to a specific type of processor. Any processors or even several processors are conceivable for implementation. The one or more processors, for example in conjunction with a firmware/UEFI (Unified Extensible Firmware Interface), can be designed to provide a secure boot operation (secure initialization operation) in order to load the computer program.

The one or more storage devices 26 may include, for example, at least one element from the group of computer readable storage medium, magnetic storage medium, optical storage medium, hard disk, flash memory, floppy disk, random access memory, programmable read only memory (PROM), erasable programmable read only memory (EPROM), electronically erasable programmable read only memory (EEPROM), and network storage.

Figure 2B:
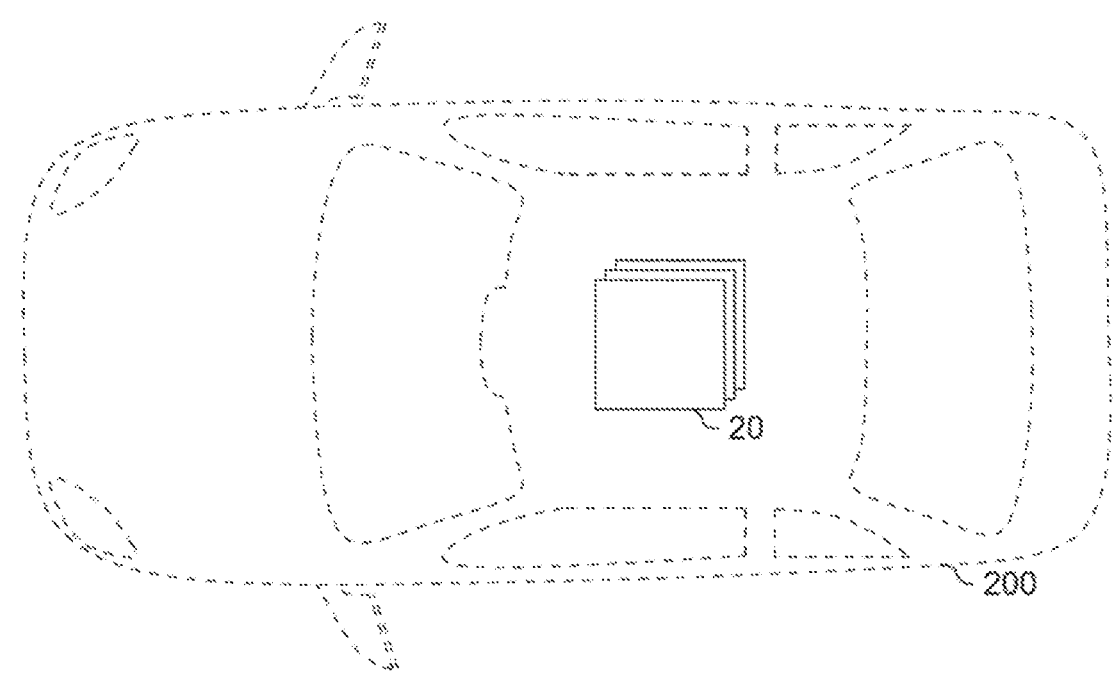
FIG. 2b shows a schematic diagram of an example of a vehicle comprising one or more vehicle components.

The present disclosure refers to vehicle components. These are (computer-based) components that are used in vehicles. Accordingly, exemplary embodiments also create a vehicle 200 comprising one or more vehicle components 20. FIG. 2b shows a schematic diagram of an example of such a vehicle 200 comprising one or more vehicle components 20 as were presented in conjunction with FIGS. 1 and 2a. The vehicle 200 may correspond, for example, to a land vehicle, a water vehicle, an aircraft, a rail vehicle, a road vehicle, a car, an off-road vehicle, a motor vehicle, or a truck.

The aspects and features described in conjunction with a particular one of the previous examples may also be combined with one or more of the further examples to replace an identical or similar feature of that further example, or to additionally introduce the feature into the further example.

Examples may further include or relate to a (computer) program comprising a program code for performing one or more of the above methods when the program is executed on a computer, a processor or other programmable hardware component. Steps, operations or processes of various of the methods described above may thus also be executed by programmed computers, processors or other programmable hardware components. Examples may also cover program storage devices, such as digital data storage media, that are machine-, processor- or computer-readable and encode or contain machine-executable, processor-executable or computer-executable programs and instructions. The program storage devices may include or be, for example, digital memories, magnetic storage media such as magnetic disks and magnetic tapes, hard disk drives or optically readable digital data storage media. Other examples may also include computers, processors, control units, (field) programmable logic arrays (F) PLAS, (field) programmable gate arrays (F) PGAs, graphics processor units (GPUs), application-specific integrated circuits (ASIC), integrated circuits (IC) or system-on-a-chip (SoC) systems programmed to perform the steps of the methods described above.

It is further understood that the disclosure of multiple steps, processes, operations or functions disclosed in the description or claims should not be construed as necessarily being in the order described, unless explicitly stated in the particular case or mandatory for technical reasons. Therefore, the preceding description does not limit the execution of several steps or functions to a specific sequence. Furthermore, in other examples, a single step, a single function, a single process or a single operation may include several sub-steps, sub-functions, sub-processes or sub-operations and/or may be broken down into same.

Where some aspects have been described in the preceding paragraphs in conjunction with a device or system, these aspects are also to be understood as a description of the corresponding method. For example, a block, a device or a functional aspect of the device or system may correspond to a feature, such as a method step, of the corresponding method. Accordingly, aspects described in conjunction with a method are also to be understood as a description of a corresponding block, a corresponding element, a property or a functional feature of a corresponding device or a corresponding system.

The following claims are hereby incorporated into the detailed description, although each claim may stand alone as a separate example. It should also be noted that, although a dependent claim in the claims refers to a particular combination with one or more other claims, other examples may also include a combination of the dependent claim with the subject matter of any other dependent or independent claim. Such combinations are hereby explicitly suggested, unless it is indicated in the individual case that a particular combination is not intended. Furthermore, features of a claim are also intended to be included for any other independent claim, even if that claim is not directly defined as dependent on that other independent claim.

LIST OF REFERENCE SIGNS 20 vehicle component
22 interface
24 processor
26 storage device
110 storing identification information
120 storing an additional authentication key
130 obtaining a computer program
140 authenticating a cryptographic signature of the computer program 150 running the computer program
160 removing the additional authentication key
200 vehicle

The invention claimed is:

1. A method for granting authorization to run a computer program using a vehicle component of a vehicle, the method comprising:
   storing identification information on the vehicle component as part of a production process, said identification information being specific to the vehicle component;
   storing an additional authentication key in the vehicle component during a development process, said additional authentication key being linked to the identification information by means of a cryptographic signature;
   obtaining the computer program for the vehicle component, wherein said computer program is cryptographically signed; and
   running the computer program if the cryptographic signature of the computer program is valid according to an authentication process using the additional authentication key and if the cryptographic signature is based on the identification information.

2. The method as claimed in claim 1, further comprising removing the additional authentication key responsive to a determination that the development process is completed.

3. The method as claimed in claim 2, further comprising using the vehicle component to perform the authentication process using the additional authentication key to determine if the cryptographic signature of the computer program is valid.

4. The method as claimed in claim 2, wherein the additional authentication key is provided to enable the running of computer programs in addition to a public key infrastructure of a manufacturer of the vehicle.

5. The method as claimed in claim 2, wherein the cryptographic signature of the computer program is specific to a single vehicle component or a single vehicle.

6. The method as claimed in claim 2, wherein the cryptographic signature of the computer program is specific to a defined set of more than one vehicle components or vehicles.

7. The method as claimed in claim 1, wherein the additional authentication key is provided to enable the running of computer programs in addition to a public key infrastructure of a manufacturer of the vehicle.

8. The method as claimed in claim 1, wherein the cryptographic signature of the computer program is specific to a single vehicle component or a single vehicle.

9. The method as claimed in claim 1, wherein the cryptographic signature of the computer program is specific to a defined set of more than one vehicle components or vehicles.

10. The method as claimed in claim 1, wherein the computer program is signed together with identification information of one or more vehicle components or vehicles.

11. The method as claimed in claim 1, wherein the cryptographic signature with which the additional authentication key is linked to the identification information is generated by a manufacturer of the vehicle.

12. The method as claimed in claim 1, wherein the cryptographic signature of the computer program is generated based on the identification information of the vehicle component or the vehicle by a manufacturer.

13. The method as claimed in claim 1, wherein the cryptographic signature of the computer program is generated based on the identification information of the vehicle component or the vehicle by a third party.

14. The method as claimed in claim 1, wherein the cryptographic signature of the computer program, the additional authentication key and the identification information is authenticated by a bootloader of the vehicle component.

15. The method as claimed in claim 14, further comprising removing the additional authentication key after the development process is completed.

16. The method as claimed in claim 15, wherein the additional authentication key is provided to enable the running of computer programs in addition to a public key infrastructure of a manufacturer of the vehicle.

17. The method as claimed in claim 15, wherein the cryptographic signature of the computer program is specific to a single vehicle component or a single vehicle.

18. The method as claimed in claim 15, wherein the cryptographic signature of the computer program is specific to a defined set of more than one vehicle components or vehicles.

19. A non-transitory storage medium storing program code for performing the method as claimed in claim 1 when the program code is run on a computer, a processor, a control module or a programmable hardware component.

20. A vehicle component comprising one or more processors and one or more memory devices, wherein the vehicle component is designed to perform the method as claimed in claim 1.

* * * * *